Dec. 20, 1955  M. LATINCICH  2,727,702
FISHERMAN'S EQUIPMENT
Filed April 10, 1953
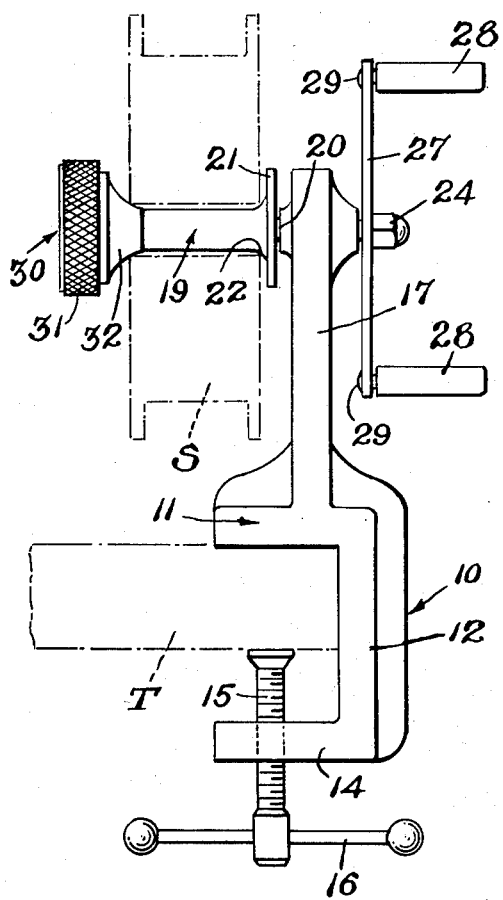
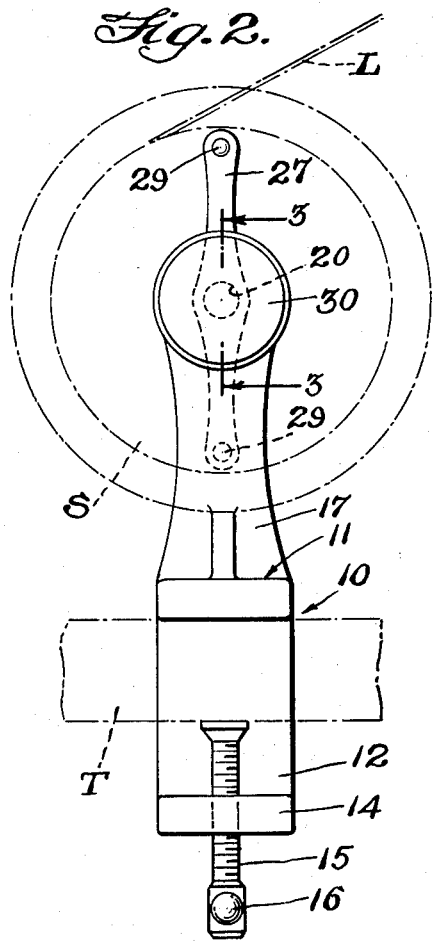
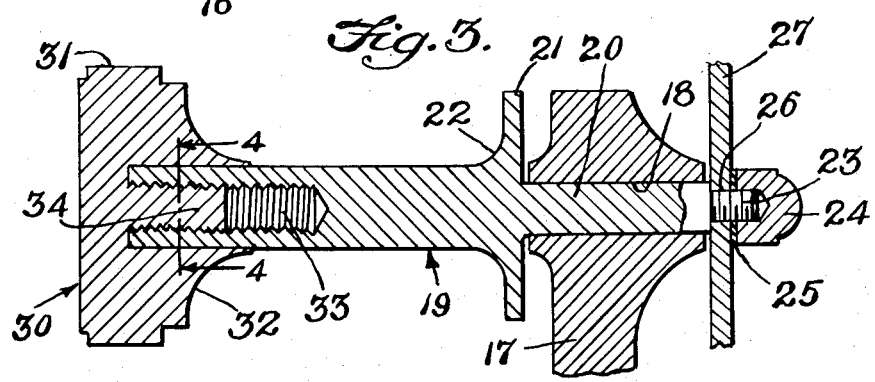
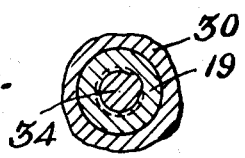
INVENTOR.
Matthew Latincich,
BY Victor J. Evans & Co.
ATTORNEYS United States Patent Office 2,727,702
Patented Dec. 20, 1955

2,727,702
FISHERMAN'S EQUIPMENT
Matthew Latincich, Farrell, Pa.
Application April 10, 1953, Serial No. 347,946
1 Claim. (Cl. 242—100)

This invention relates to fishing equipment, and more particularly to a device for facilitating the winding or unwinding of fishing lines.

The object of the invention is to provide a mechanism which can be readily attached to a supporting structure, the mechanism adapted to hold a spool thereon, whereby a fishing line can be conveniently and readily changed from one spool to another.

Another object of the invention is to provide a spool holding mechanism which will permit a fisherman to quickly interchange fishing lines, the mechanism being easy to handle, ruggedly constructed, and wherein various sizes of spools are adapted to be supported on the mechanism of the present invention.

A further object of the invention is to provide a mechanism which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the spool holding mechanism of the present invention;

Figure 2 is an end elevational view of the spool holding mechanism of the present invention;

Figure 3 is a sectional view taken on the line 3—3 of Figure 2;

Figure 4 is a sectional view taken on the line 4—4 of Figure 3.

Referring in detail to the drawings, the numeral 10 designates a bracket which may be fabricated of any suitable material, Figure 1, and the bracket 10 includes a base 11, a web 12 and a leg 14. The bracket 10 is adapted to be connected to any suitable supporting structure, such as a bench or table T, broken lines in Figures 1 and 2. Arranged in threaded engagement with the leg 14 of the bracket 10 is a clamp screw 15, and a pin 16 is arranged in sliding engagement with the lower end of the clamp screw 15. The pin 16 can be used for manually adjusting the clamp screw 15 in the leg 14, whereby the bracket 10 can be securely clamped to the table or bench T.

Extending upwardly from the bracket 10 or formed integrally therewith is an arm 17, and the arm 17 is provided with an opening or hole 18 therein, Figure 3.

The mechanism of the present invention further includes a rotatable spindle 19 which includes a shaft portion 20 that rotatably extends through the opening 18 in the upper end of the arm 17. Formed integrally with the spindle 19 is an annular flange 21, the spindle 19 including an arcuate portion 22 which extends between the flange 21 and the main body of the spindle.

A means is provided for maintaining the spindle 19 connected to the arm 17. This means comprises a threaded stud or screw 23 that extends through an opening 26 in a handle 27. A washer 25 is circumposed on the stud 23, and a nut 24 is arranged in threaded engagement with the outer end of the stud 23. The spindle 19 is adapted to support thereon a spool S (broken lines, Figures 1 and 2), and a suitable fishing line L (broken lines, Figure 2) is adapted to be trained over or wound upon the spool S.

For rotating the spindle 19 and the spool S thereon, a pair of spaced parallel knobs or hand grips 28 are secured to the handle 27 by suitable securing elements, such as rivets 29. For maintaining the spool S on the spindle 19, a thumb screw 30 is provided. The thumb screw 30 includes an exteriorly knurled portion 31, and a tapered or curved portion 32. By adjusting the position of the thumb screw 30, the curved portions 32 and 22 will coact to support spools S of various sizes thereon. The spindle 19 is further provided with an interiorly threaded socket 33, and the socket 33 is adapted to receive therein an exteriorly threaded finger 34 which extends from or is formed integrally with the thumb screw 30.

In use, the bracket 10 is clamped to any suitable supporting structure, such as a bench or table T. Then, the thumb screw 30 is unscrewed or removed from the spindle 19, and an empty spool S is arranged over or on the spindle 19. Then, the thumb screw 30 is screwed back onto the spindle 19 until it tightens against the empty spool S. Then, the spindle 19 and spool S can be rotated by means of the handle 27 and knobs 28, so that one fishing line can be exchanged with another. Or, a fishing line can be unwound from a reel or spool onto the spool mounted on the spindle 19, thereby facilitating the changing of fishing lines. After the fishing line has been wound on the spool, the thumb screw 30 is removed, then the spool S is removed from the spindle, and finally, the thumb screw 30 is replaced on the spindle.

The mechanism of the present invention is easy to handle, ruggedly constructed, small and compact, so that it can be carried along in a person's fish box. Also, the mechanism can be quickly put into operation, so that a fishing line can be quickly changed. By means of the mechanism of the present invention it will not be necessary for a fisherman to have his fishing line pile up on the floor during changing of lines, and the winding mechanism can be inexpensively and easily manufactured or produced. If desired, a clicker can be added to the device. The winder of the present invention will enable a fisherman to change the fishing line being used rapidly, or the winding will serve to hold a spool which can be later used on the fishing reel. Further, as previously stated, the device is intended to be used for changing fishing lines and will accommodate many sizes of spools.

What is claimed is:

A device for holding a spool when a fishing line is to be changed from one spool to another, comprising a bracket adapted to be secured to a supporting structure, a vertically disposed arm extending upwardly from said bracket and provided with a central opening adjacent its upper end, a rotatable spindle including a reduced diameter cylindrical shaft portion rotatably engaging the opening in said arm, said spindle further including an annular flange and an arcuate portion arranged adjacent to said flange, a handle provided with a central opening, a stud of reduced diameter extending through the opening in said handle and said stud extending from said spindle, a thumb screw including an exteriorly knurled portion and a tapered portion for coaction with the arcuate portion of said spindle, said tapered portion and arcuate portion serving to support therebetween a spool having a fishing line thereon, said spindle further including an interiorly threaded socket, and an exteriorly threaded finger extending from said thumb screw and engaging said socket, the tapered portion of said thumb screw merging smoothly into said spindle.

References Cited in the file of this patent
UNITED STATES PATENTS

| Number | Name | Date |
|---|---|---|
| 285,630 | Kasschau | Sept. 25, 1883 |
| 362,731 | Ellis | May 10, 1887 |
| 452,275 | Meinzer | May 12, 1891 |
| 2,007,705 | Brugger | July 9, 1935 |
| 2,515,430 | Tomala | July 18, 1950 |
| 2,531,816 | Homoky | Nov. 28, 1950 |